June 5, 1956
L. H. FLORA
2,748,906
FASTENING DEVICE
Filed Nov. 5, 1951
2 Sheets-Sheet 1
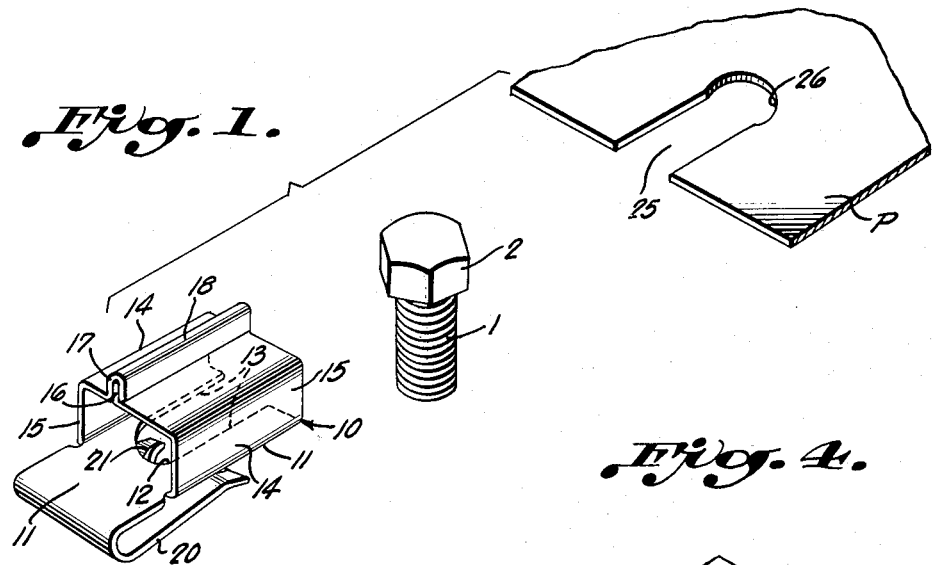
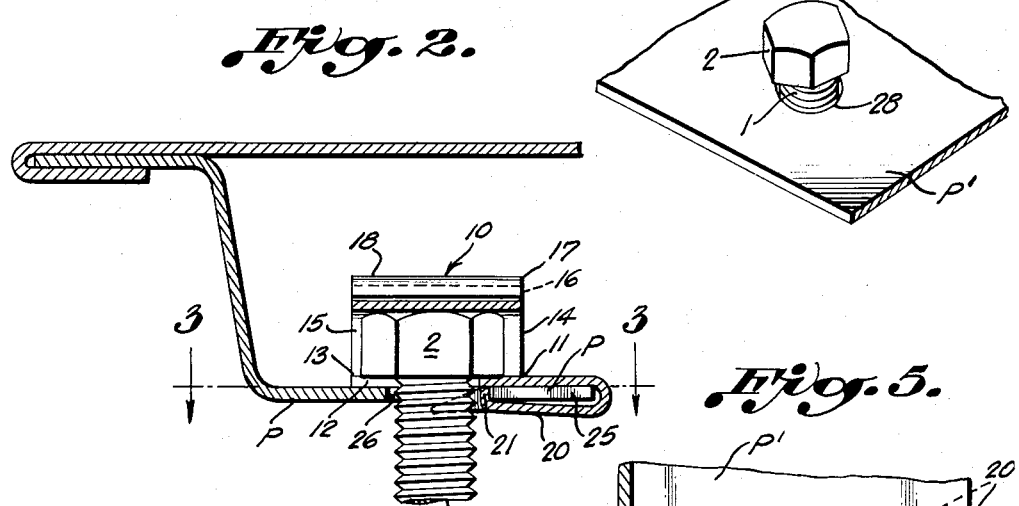
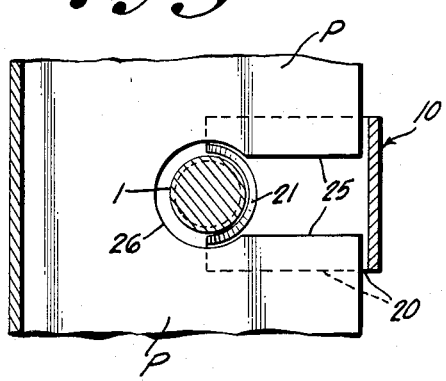
INVENTOR
LAURENCE H. FLORA
BY H. G. Lombard
ATTORNEY

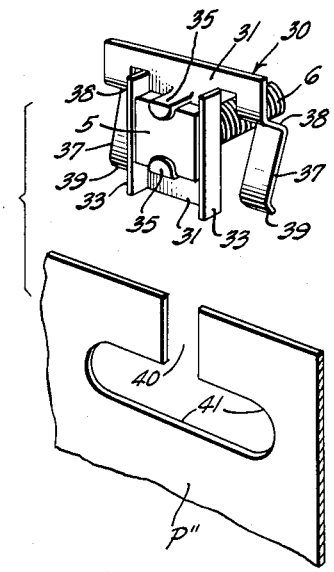
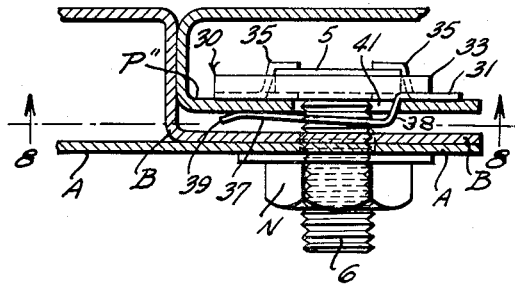
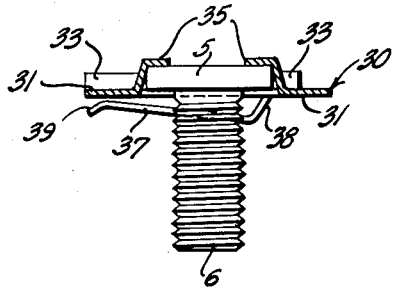
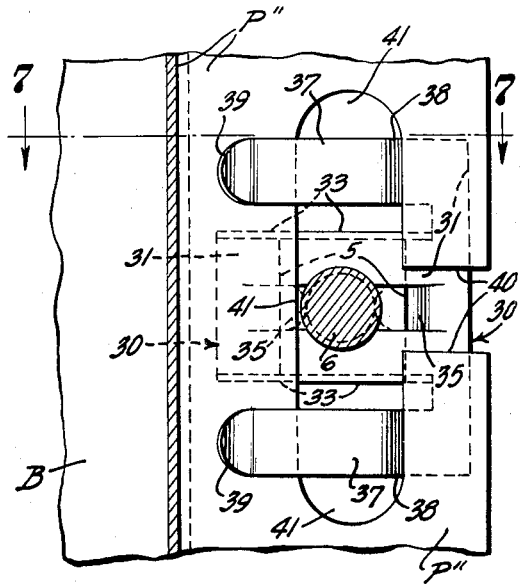
INVENTOR
LAURENCE H. FLORA
BY  H. G. Lombard
ATTORNEY

United States Patent Office 2,748,906
Patented June 5, 1956

2,748,906
FASTENING DEVICE

Laurence H. Flora, Cleveland, Ohio, assignor to Tinnerman Products, Inc., Cleveland, Ohio, a corporation of Ohio Application November 5, 1951, Serial No. 254,925

3 Claims. (Cl. 189—35)

This invention relates in general to bolt fastened installations and deals, more particularly, with improvements in bolt holding devices for attaching standard bolts, screws, rivets, and similar headed studs in fastening position in an assembly prior to the application of a cooperating nut device thereto for securing the parts of the assembly.

In many assemblies, it is necessary or desirable to use a standard nut and bolt fastening means but it is usually a difficult problem, especially in blind locations, for the operator to hold the bolt in place as the nut is applied, or otherwise, to maintain the bolt against rotation during the final tightening of the nut therewith. In most assemblies in which the rearward side of a part is not conveniently or readily accessible for holding a bolt in fastening position prior to application of the cooperating nut, it is necessary to resort to some form of riveting, welding or other attaching means for retaining the bolt in fastening position. In the average installation requiring a cheap, inexpensive bolt holding means, the cost of welding, or riveting or installing clinch-on bolt holders, and the like, generally is so expensive as to make the use thereof prohibitive.

A primary object of the present invention, therefore, is to provide an improved sheet metal bolt holder or retainer which is relatively simple and inexpensive to manufacture in comprising a simplified construction for fitting onto the bolt head together with an easily and quickly applied clip type of attaching means adapted to clasp a part adjacent a bolt opening therein to hold the bolt in attached fastening position in said bolt opening.

A further object of the invention is to provide a bolt holder of this character comprising cooperating base and arm portions for embracing the apertured part to which the bolt is to be attached, together with means on one of said portions adapted to lock the bolt holder in attached fastening position.

Another object of the invention is to provide various forms of bolt holders, such as described, comprising a one-piece sheet metal clip device or the like adapted to be easily and quickly applied to attached fastening position on a part to hold the bolt in attached fastening position while otherwise retaining the bolt against axial displacement and/or turning as the associated nut is threaded thereon and tightened.

A further object of the invention is to provide an improved fastening installation in which the aforesaid bolt holders are preassembled with the bolt and adapted to be applied over the edge of a part having a slot for passing the bolt shank in the application of the bolt holder to attached fastening position on such part.

Further objects and advantages and other new and useful features in the construction, arrangement and general combination of features of the invention will be readily apparent as the following description proceeds with reference to the accompanying drawings, for purposes of illustration but not of limitation, in which like reference characters designate like parts throughout, and in which:

Fig. 1 is an exploded perspective view illustrating one form of bolt holder in accordance with the invention in position to be assembled with a bolt to be attached in fastening position on an apertured edge portion of a panel or other part;

Fig. 2 is a vertical sectional view of an assembly in which the bolt holder shown in Fig. 1 is attached over the edge of an apertured panel to retain the bolt in fastening position on said panel;

Fig. 3 is a sectional view of Fig. 2 along line 3—3 looking in the direction of the arrows, and shows the general form of combined slot and bolt opening provided in the apertured edge portion of the panel;

Fig. 4 illustrates an alternate arrangement for assembly and attachment of the bolt holder of Figs. 1–3, inclusive, in a procedure wherein the bolt is first assembled in a circular bolt opening in an apertured edge portion of a panel or other part and the bolt holder then applied to provide the same general fastening installation substantially as shown in Fig. 2; and, Fig. 5 is a sectional view, similar to Fig. 3, illustrating the attachment of the bolt in fastening position in the circular bolt opening as shown in Fig. 4.

Fig. 6 shows another form of bolt holder in accordance with the invention which is preassembled with the bolt and adapted to be applied to fastening position over an apertured edge portion of a panel, or the like, having a slot for passing the shank of the bolt in the application of the bolt holder to fastening position;

Fig. 7 is a vertical sectional view, as along line 7—7 of Fig. 8, showing the bolt holder of Fig. 6 in applied fastening position in an assembly;

Fig. 8 is a sectional view of Fig. 7 on line 8—8, looking in the direction of the arrows; and, Fig. 9 is a sectional view along the transverse center line of the bolt holder shown in Figs. 6-8, inclusive.

Generally speaking, a bolt holder in accordance with the invention is best provided from a suitable sheet metal strip, preferably spring metal or cold rolled metal having spring-like characteristics. The bolt holding portion of the device is readily adapted to be provided in various forms to accommodate any selected type of bolt head together with an attaching portion in the form of one or more cooperating spring arms, or the like, by which the bolt holder is easily and quickly applied to fastening position on an apertured edge portion of a panel or other part substantially by a clip or clasping type fastening action. The attaching means of the bolt holder is desirably provided by cooperating portions for clasping the opposite surfaces of the part to which the bolt holder is attached together with means on one of said portions receivable in the bolt hole in said part for locking the bolt holder in such attached position. Preferably, such locking means is provided on an attaching arm included in the attaching portion of the bolt holder and adjacent a sight opening in said arm which advantageously facilitates the application of the bolt holder to its attached position and the fastening position of the bolt retained thereby.

Referring now, more particularly, to the drawings, the bolt holder shown in Figs. 1–5, inclusive, is of a character adapted for a wide range of applications and uses and may be installed in different ways depending on the nature of the installation. The bolt holder, designated generally 10, is constructed from a sheet metal section of a size and configuration determined by the size and the shape of the bolt head with which it is to be used. The bolt holder 10 may be provided for use with any type of bolt head and, in the present example, is shown as provided for use with a standard bolt 1 having a hexagon shaped head 2.

The sheet metal section forming the bolt holder 10 is so provided as to define an intermediate base or body portion 11 provided with an opening 12 in the form of a slot at one end defining a pair of spaced shoulders 13 having a spacing suitable for receiving the shank of the bolt 1. A pair of arms 14 at opposite sides of said base 11 are bent upwardly from the base to define a cage approximating the size of the bolt head 2 including a pair of side flanges 15 adapted for abutting relation with opposite side faces of said bolt head. One of said arms 14 has its end bent into an outwardly projecting tongue 16 which is retained in a fold 17 on the end of the other arm in the manner of a beading or a seam 18 which prevents spreading of the side flanges 15 from their proper position in abutting relation to the engaged side faces of the bolt head 2. This arrangement permits a high torquing of the nut applied to the bolt without danger of the bolt head 2 separating the arms 14 of the cage. In the bolt holder, thus provided, this cage portion receives the hexagon shaped head 2 of the bolt with opposing faces of the bolt head in abutting relation with the flange portions 15 of the arms 14. The shank of the bolt is receivable in the slot 12 with the head of the bolt resting on the spaced shoulders 13. The curved end of the slot 12 limits the movement of the bolt within the bolt holder and thereby indicates the predetermined assembled relation of the bolt and bolt holder with the shank of the bolt 1 extending through the passage defined by the end portion of said slot 12.

The attaching arm 20 of the bolt holder is formed by a generally U-shaped return bend of the other end portion of the base or body 11 and terminates substantially below the bolt passage therein defined by the curved end of the slot 12. The extremity of the attaching arm 20 is recessed in a manner to define a suitable sight opening and an adjacent locking projection or detent 21 projecting inwardly toward the base 11. Said detent 21 is desirably formed from a marginal edge portion of such sight opening to define a generally semicircular indexing or positioning element which snugly engages the periphery of the bolt opening in a part to be secured to retain the assembled bolt and bolt holder in attached position thereon. The locking detent 21 preferably has its upper edge surface tapered generally outwardly toward the free end of the attaching arm 20 to define an inclined cam surface which provides a flared opening between said arm 20 and the intermediate base or body 11.

The bolt holder, thus provided, is adapted to be applied to retain the bolt 1 in attached position over an apertured edge portion of a supporting panel or other part either when the bolt 1 is preassembled therewith or when the bolt is first inserted in fastening position in a bolt hole in the supporting panel and the bolt holder 10 then applied to retain the bolt in such fastening position. In the latter procedure, the supporting panel may be prepared in either of two arrangements; as shown in Figs. 1–3, inclusive, the supporting panel P is provided with a slot 25 defining a passage leading to the bolt hole 26 in which the bolt shank is disposed in applied fastening position; in the alternate procedure, illustrated in Figs. 4 and 5, the supporting panel P', is provided with a simple circular bolt hole 28 receiving the shank of the bolt 1.

In completing the installation of Figs. 1–3, inclusive, with the bolt 1 preassembled with the bolt holder 10, the bolt 1 is assembled in the slot 12 in the base 11 of the bolt holder, as aforesaid, with the bolt head 2 positioned within the cage provided by the arms 14 and the bolt shank extending through the end portion of said slot 12 and the opening in line therewith in the end of the attaching arm 20. With the assembled bolt 1 and bolt holder 10, thus provided, the shank of the bolt is positioned in the open end of the slot 25 and the attaching arm 20 of the bolt holder simultaneously applied over the edge of panel P to a position in which the bolt holder retains the bolt in the bolt hole 26 in said panel.

Preferably, the normal spacing of the attaching arm 20 from the base 11 is slightly less than the thickness of the panel P such that said attaching arm 20 must be spread slightly outwardly over the edge of said panel. The bolt holder is then pushed to the fully attached fastening position shown in Figs. 2 and 3 in which the base 11 and attaching arm 20 resiliently clasp opposite sides of said part P. In this respect, the inclined cam surface of the locking detent 21 defines a flared entrance at the leading end of the attaching arm 20 which facilitates the initial application thereof to the panel P by causing a gradual outward camming of said arm 20 as necessary to clear the edge of the panel easily and quickly. The opening on the end of the attaching arm 20 leaves the bolt hole 26 in the panel P uncovered and fully visible such that this opening serves as a sight opening by which the attaching arm of the bolt holder may be guided readily, in the least amount of time and effort, to the proper location in which the locking detent 21 thereon will snap into said bolt hole 26 in the final applied fastening position of the bolt on said panel P, substantially as shown in Figures 2 and 3. The locking detent 21 preferably is semicircular, and thereby snugly engages the curved edge portions of the bolt hole 26, as best seen in Figure 3, to lock the bolt holder and the bolt retained thereby in applied fastening position ready for the application of a nut to the bolt shank to secure a cooperating part to said panel P.

The bolt holder 10 is applied to attached fastening position and functions in such attached fastening position substantially in the manner described with reference to Figs. 1–3, inclusive, either when the bolt 1 is preassembled therewith or when the bolt holder is snapped into assembled relation with the bolt after the bolt has been first positioned in the bolt hole 26 in the supporting part P, as aforesaid. When the bolt is first positioned in the bolt hole 26, the bolt holder is applied over the edge of the supporting panel P in the procedure just described while guiding the cage of the bolt holder toward and over the bolt head 2 such that the bolt and holder have the identical attached position on the supporting part P as shown in Fig. 2.

Likewise, in the installation of Figs. 4 and 5, the bolt 1 also is first positioned in the simple circular bolt hole 28 in panel P' and the bolt holder 10 then applied in a similar manner over the edge of said panel P' to assembled relation with the bolt head 2 in which the detent 21 is received in the bolt hole 28, as seen in Fig. 5, to lock the bolt holder 10 and bolt 1 retained thereby in final applied fastening position.

Figs. 6–9, inclusive, show another form of a combined bolt and bolt holder having the general purpose and function of that described with reference to Figs 1–3, inclusive. In this form of the invention, the bolt holder, designated generally 30, is constructed from a piece of sheet metal defining a base 31 and adjoining upturned flanges 33 for engaging the opposite side faces 5 of a square headed bolt 6. A pair of tongues 35 is stamped upwardly out of the base 31 in a manner whereby the area from which said tongues are provided defines an opening for receiving the shank of the bolt 6. The bolt holder 30 is assembled with the bolt head 5 seated on the base 31 and the side flanges 33 engaging the opposite side faces 5 of the bolt head to prevent relative rotation thereof while the tongues 35 are disposed in overlapping engagement with the top of the bolt head to prevent axial displacement of the bolt from assembled relation with said bolt holder 30.

At opposite ends of the fastener base 31, there are provided a pair of attaching arms 37 which are bent downwardly and outwardly from the plane of the base 31 in a manner to define pronounced shoulders 38 adjoining said base. These arms 37 otherwise extend inwardly in inclined relation toward the base 31 and terminate in outwardly flared ends 39 for facilitating the initial application of the bolt holder to attached position over the edge of an apertured supporting panel P″.

The supporting part in the form of a panel P″, or the like is prepared with a T-shaped opening, as best seen in Fig. 6, comprising a slot 40 leading to an elongate bolt hole 41. If desired, the slot 40 may be omitted and the bolt hole 41 provided as a simple transverse opening such that the edge of the panel is imperforate and of maximum strength where necessary or desirable. The combined bolt and bolt holder is applied to the panel opening, as illustrated in Fig. 6, in a manner to position the bolt head 5 at the rearward side of said panel P″ while the shank 6 projects from the forward side thereof in position for the application of a nut N thereto for securing one or more cooperating parts A, B, to said panel P″. The fastening device is applied by advancing the bolt shank 6 through the slot 40 with the base 30 of the bolt holder seated on the rearward side of said panel P″, and simultaneously slipping the free ends of the arms 37 through the hole 41 from the rearward side of panel P″ to extend to the opposite forward side of said panel P″. The outwardly flared extremities 39 on said arms 37 facilitate this action by causing a gradual outward camming of said arms 37 over the engaged edge of the bolt hole 41.

The bolt holder is then advanced to the fully attached position thereof in which the shoulders 38 on the arms 37 snap into the bolt hole 41 in engagement with the adjacent marginal edge portion of said opening 41, substantially as seen in Figs. 7 and 8. The shoulders 38, accordingly, lock the bolt holder in fully attached position with the base 31 of the bolt holder engaging the rearward side of the panel P″ in cooperation with the arms 37 engaging the forward side of said panel P″.

When the bolt hole is provided as a simple transverse opening without the slot 40, the combined bolt and bolt holder is readily applied to a similar attached position by inserting the bolt shank 6 through the hole 41 and canting and working the device as necessary for the arms 37 to pass through said opening and engage the forward side of the panel P″ in cooperation with the base 31 engaging the rearward side of said panel P″, as aforesaid.

A divisional application Serial Number 411,804, filed February 23, 1954, is directed to the form of invention shown in Figs. 6–9, inclusive.

The bolt holder, in any form, preferably is constructed of relatively thin sheet metal the thickness of which is selected according to service requirements and the predetermined size of the bolt to be retained thereby. The bolt holder is most effective when provided of spring metal suitably spring tempered and otherwise treated to give the desired toughness and hardness. A cheap and highly effective bolt holder may be provided from cold rolled metal such as cold rolled steel which is untempered but of a spring metal nature and capable of providing an effective and reliable fastening device as and for the purposes described.

While the invention has been described in detail with specific examples, such examples are intended as illustrations only, inasmuch as the invention fully contemplates various modifications which may be provided without departing from the spirit and scope of the invention.

What is claimed is:

1. A fastening assembly comprising a panel or the like having a bolt hole and a bolt having its shank extending through said bolt hole, and a bolt holder comprising a sheet metal body providing a base and a pair of arms extending outwardly from the sides of said base and defining opposite side flanges in abutting relation with opposite side faces of the head of said bolt, one end of said base between said side flanges having a slot leading to an opening receiving the shank of said bolt with the head of said bolt bearing on said base and with said opposite side faces of said bolt head in nonrotatable abutting relation with said side flanges, an attaching arm extending from the other end of said base and projecting from the underside of said base, said underside of said base seating on one surface of said panel over said bolt hole therein, and said attaching arm engaging the opposite surface of said panel in cooperation with said underside of said base.

2. A fastening assembly comprising a panel or the like having a bolt hole and a bolt having its shank extending through said bolt hole, and a bolt holder comprising a sheet metal body providing a base and a pair of arms extending outwardly from the sides of said base and defining opposite side flanges in abutting relation with opposite side faces of the head of said bolt, the ends of said arms extending toward each other over the top of said bolt head and one of said arms terminating in a bent fold and the other terminating in a tongue secured in said fold, one end of said base between said side flanges having a slot leading to an opening receiving the shank of said bolt with the head of said bolt bearing on said base and with said opposite side faces of said bolt head in nonrotatable abutting relation with said side flanges, an attaching arm extending from the other end of said base and projecting from the underside of said base, said underside of said base seating on one surface of said panel over said bolt hole therein, and said attaching arm engaging the opposite surface of said panel in cooperation with said underside of said base.

3. A fastening device comprising a bolt having a head provided with opposite side faces and a bolt holder comprising a sheet metal body providing a base and a pair of arms extending outwardly from the sides of said base and defining opposite side flanges, the ends of said arms extending toward each other in position to overlie the top of said bolt head and one of said arms terminating in a fold and the other arm terminating in a tongue secured in said fold, one end of said base between said side flanges having a slot leading to an opening receiving the shank of said bolt with the head of said bolt bearing on said base and with said opposite side faces of said bolt head in nonrotatable abutting relation to said side flanges, an attaching arm extending from the other end of said base and projecting from the underside of said base, said underside of said base being adapted to seat on one surface of a part over a bolt hole therein with the shank of said bolt projecting through said bolt hole in fastening position, and said attaching arm being adapted to cooperate with said underside of said base in engaging opposite surfaces of said part to retain the bolt holder in said fastening position of the bolt.

References Cited in the file of this patent

UNITED STATES PATENTS

| | | |
|---|---|---|
| Re. 10,339 | Bette | June 12, 1883 |
| 1,392,561 | Duffy | Oct. 4, 1921 |
| 1,473,177 | Coyne | Nov. 6, 1923 |
| 1,545,402 | Coyne | July 7, 1925 |
| 1,581,416 | Alpaugh | Apr. 20, 1926 |
| 2,159,573 | Tinnerman | May 23, 1939 |
| 2,236,850 | Hansman | Apr. 1, 1941 |
| 2,495,037 | Tinnerman | Jan. 17, 1950 |
| 2,552,499 | Tinnerman | May 8, 1951 |
| 2,562,001 | Tinnerman | July 24, 1951 |
| 2,571,786 | Tinnerman | Oct. 16, 1951 |
| 2,581,481 | Hartman et al. | Jan. 8, 1952 |
| 2,605,806 | Tinnerman | Aug. 5, 1952 |
| 2,654,411 | Bedford | Oct. 6, 1953 |
| 2,683,577 | Flora | July 13, 1954 |

FOREIGN PATENTS

| | | |
|---|---|---|
| 181,498 | Great Britain | June 16, 1922 |